United States Patent [19]

Hara et al.

[11] 4,079,946

[45] Mar. 21, 1978

[54] TURNTABLE ASSEMBLY FOR PHONOGRAPH RECORDS

[75] Inventors: Hideo Hara, Yokohma; Isao Kawashima, Yachiyo, both of Japan

[73] Assignee: Sony Corporation, Tokyo, Japan

[21] Appl. No.: 567,052

[22] Filed: Apr. 11, 1975

[30] Foreign Application Priority Data

Apr. 23, 1974 Japan .................................. 49-45091

[51] Int. Cl.² .......................... G11B 3/60; F16F 15/04
[52] U.S. Cl. .................................. 274/39 R; 248/350;
248/358 R; 206/307; 206/521
[58] Field of Search ................... 274/39; 248/22, 358,
248/400, 350, 346, 176; 206/307, 309, 521, 522,
523; 267/113; 5/348 WB, 365, 367, 368;
108/161

[56] References Cited
U.S. PATENT DOCUMENTS

| 1,163,566 | 12/1915 | Scotford | 274/39 R |
|---|---|---|---|
| 1,786,445 | 12/1930 | Naylor | 274/39 R |
| 3,142,599 | 7/1964 | Chavannes | 206/522 |
| 3,245,177 | 4/1966 | Chen | 188/1 B |
| 3,462,027 | 8/1969 | Puckhaber | 206/522 |
| 3,574,379 | 4/1971 | Jordan | 267/140 |
| 3,679,159 | 7/1972 | Bach et al | 267/153 |
| 3,747,914 | 7/1973 | Thrasher | 248/358 R |
| 3,787,908 | 1/1974 | Beck et al. | 5/348 WB |
| 3,810,265 | 5/1974 | McGrew | 5/348 WB |
| 3,820,162 | 6/1974 | McGrew | 206/523 |

Primary Examiner—Richard E. Aegerter
Assistant Examiner—John W. Shepperd
Attorney, Agent, or Firm—Lewis H. Eslinger; Alvin Sinderbrand

[57] ABSTRACT

A phonograph record turntable assembly comprises a rotatable turntable having a rubber or other elastically flexible sheet overlying a substantial portion of its upper surface and secured thereto at least along an edge or edges of the sheet for defining at least one sealed interior space which contains a fluid material, preferably in the form of a viscous liquid, so as to provide a cushioned, vibration-damping record supporting surface which conforms to the shape of a warped or otherwise distorted phonograph record placed thereon. In order to avoid the accumulation of the liquid at any one portion of the interior space when the turntable is not horizontally disposed, such interior space may be divided into a plurality of liquid-containing compartments which are isolated from each other, as by partitions therebetween, and/or each interior space or compartment may further contain absorbent material which takes up the viscous liquid. The vibration-damping properties of the turntable assembly may be enhanced by providing solid particles which float in the viscous liquid.

3 Claims, 7 Drawing Figures

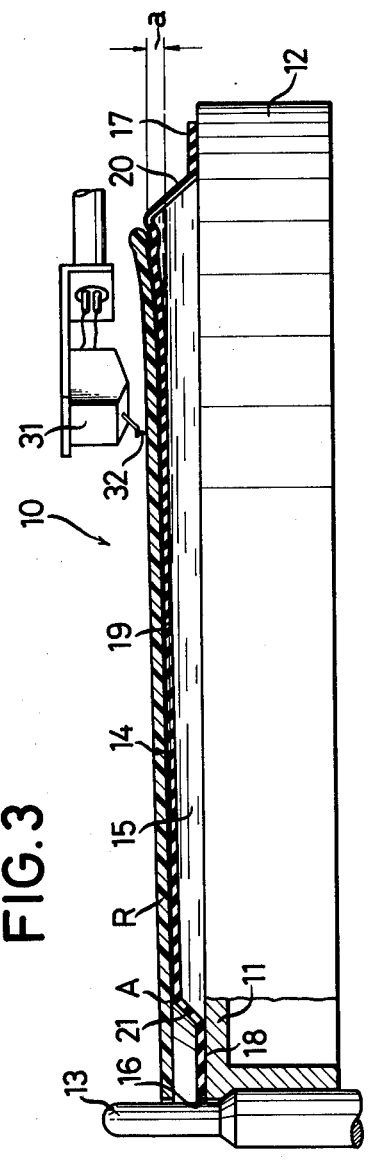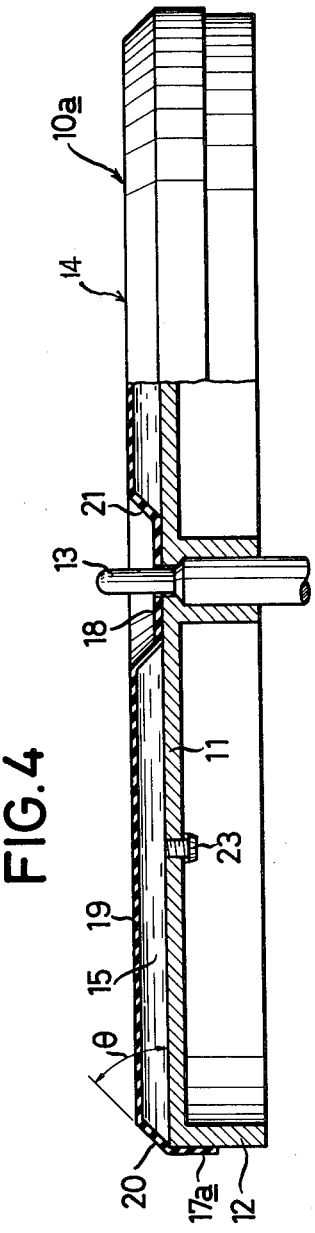

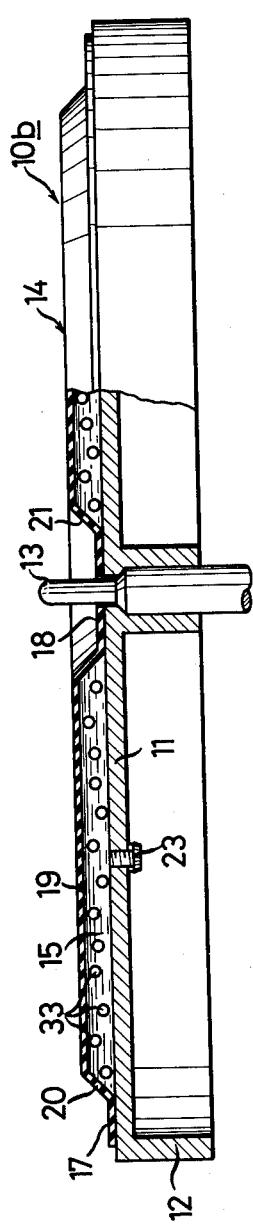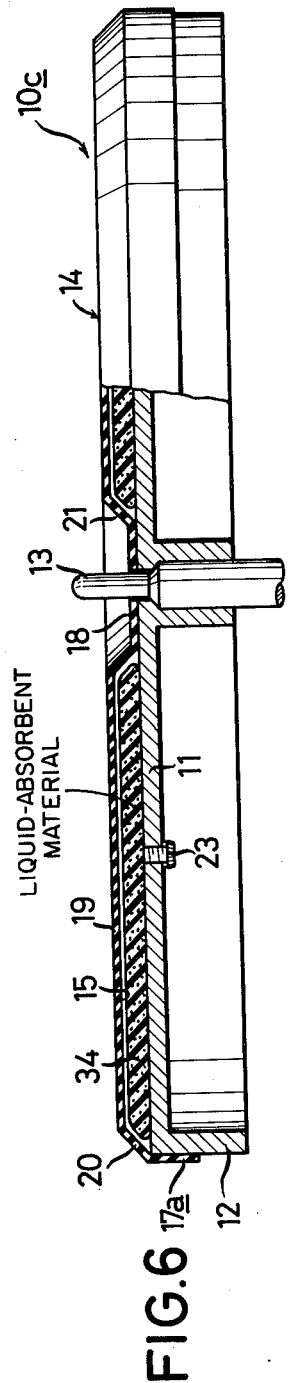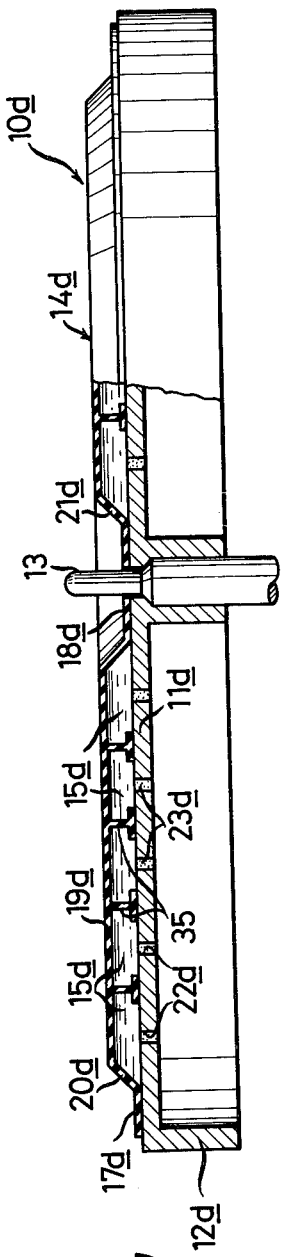

TURNTABLE ASSEMBLY FOR PHONOGRAPH RECORDS

BACKGROUND OF THE INVENTION

1. Field of the Invention

This invention relates generally to a turntable assembly for phonograph records, and more particularly is directed to improvements in the means by which the phonograph records are supported on the rotatable turntable of a phonograph record player.

2. Description of the Prior Art

Phonograph pickup cartridges are being continuously improved by being made lighter in weight and capable of playing or reproducing phonograph records with decreased vertical contact pressures of the stylus in the record groove. For example, cartridges are presently available that can play phonograph records quite well with a vertical contact force of only one-half gram, and it is anticipated that, in the near future, cartridges will be available to play phonograph records with a vertical contact force of only about one-tenth gram. When using such cartridges, it is important that some means be provided to permit the playing of phonograph records that are not perfectly flat, that is, records that are warped or distorted from a flat plane. Since phonograph records are made of plastic materials which deform under continuous stress and exposure to elevated temperatures, such phonograph records may become distorted or warped either by reason of improper manufacture or because they are not stored under ideal conditions. When a warped or distorted phonograph record is placed on an existing turntable, the undersurface of the record does not contact the surface of the turntable over its entire area so that gaps or spaces are left between the record and turntable with the result that the record is at least partly in a floating or unstable condition. During reproduction of the signals recorded on such a distorted or warped record, the tracking of the needle or stylus of the cartridge in the record groove generates considerable forces which react on the phonograph record. Due to the unstable floating condition of the warped record, such forces are apt to produce vertical vibration of the record at a resonance frequency of the latter. Accordingly, the frequency characteristics of the reproduced signal are disturbed, particularly in the vicinity of such resonance frequency, and such disturbance of the frequency characteristics cannot be corrected or removed even though the remainder of the sound reproducing system, such as, the turntable, pickup arm, amplifier and speakers may be components of high quality. The foregoing problems are particularly disturbing in the case of the reproduction of stereo records in which vertical vibrations of the stylus are intended to correspond to right-left difference signals. By reason of the vertical vibrations of a warped or distorted record at its resonance frequency, sounds which originated at the center may be displaced toward the right and left in the reproduced stereophonic sounds so that the stereophonic effect is distorted.

Although conventional phonograph record turntables are usually provided with a rubber mat having concentric circular grooves or ridges on its upper surface, such rubber mats are obviously not adapted to ensure uniform supporting contact with the undersurface of a record over the entire area of the latter when the record is substantially warped or distorted. Further, although the existing rubber mats on phonograph record turntables are intended to absorb vibrations transmitted to the turntable, for example, by the drive assembly for the latter, such rubber mats do not fully absorb or damp the vibrations which are, at least to some extent, transmitted to the record and then picked up by the cartridge so as to be reproduced as corresponding noise signals.

OBJECTS AND SUMMARY OF THE INVENTION

Accordingly, it is an object of this invention to provide a phonograph record turntable assembly by which a phonograph record supported thereon is restrained from vibrating so that signals recorded on the record can be very accurately reproduced without distortion even though the record is warped and reproduction is effected with a cartridge having a very low contact pressure thereagainst.

Another object is to provide a phonograph record turntable assembly which is capable of close supporting contact with a phonograph record even though the latter is substantially warped or deformed from a flat plane.

A further object is to provide a phonograph record turntable assembly, as aforesaid, which is effective to damp vibrations generated by a drive source for the turntable or resulting from external shocks or impacts to which the turntable or its supporting cabinet may be subjected, so that such vibrations are not transmitted to a phonograph record supported on the turntable and the inclusion of resulting noises in the reproduced signals ia avoided.

A still further object is to provide a phonograph record turntable assembly, as aforesaid, which can be relatively simply and inexpensively produced.

In accordance with an aspect of this invention, a rotatable turntable is provided with a rubber or other elastically flexible sheet overlying at least a substantial portion of its upper surface and secured thereto along an edge or edges of the sheet for defining at least one sealed interior space between such sheet and the upper surface of the turntable, and a fluid material, preferably in the form of a viscous liquid, is contained in each interior space so as to provide a cushioned, vibration-damping record supporting surface which conforms closely to the undersurface of a phonograph record placed on that surface even though the record is warped or otherwise distorted.

In order to enhance the vibration-damping properties of the turntable assembly, each sealed interior space thereof may further contain solid particles which float in the viscous liquid so that the frictional resistance to movement of the viscous liquid relative to the particles floating therein is effective to further damp the transmission of vibrations from the turntable to a phonograph record supported thereon.

It is a further feature of this invention to avoid the accumulation of the viscous liquid at any one portion of the space under the elastically flexible sheet when the turntable is not horizontally disposed either by dividing the interior space into a plurality of liquid-containing compartments which are isolated from each other, as by partitions therebetween, and/or by including in each interior space or compartment an absorbent material which takes up the viscous liquid. In order to facilitate the filling of the aforementioned interior space with the viscous liquid, the turntable may be formed with one or more filler openings communicating with such interior space to receive the viscous liquid with the turntable inverted, whereupon, each filler opening is closed, for example, with a tapped plug or the like, to seal the interior space with the viscous liquid therein.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 3 is an enlarged, fragmentary sectional view of the turntable assembly of FIG. 1 showing the manner in which such assembly supports a warped phonograph record during the playing thereof;

FIG. 4 is a side elevational view, partly broken away and in section, of a turntable assembly according to another embodiment of this invention; and FIGS. 5, 6 and 7 are views similar to that of FIG. 4, but showing additional respective embodiments of the invention.

DESCRIPTION OF PREFERRED EMBODIMENTS

Figure 1:
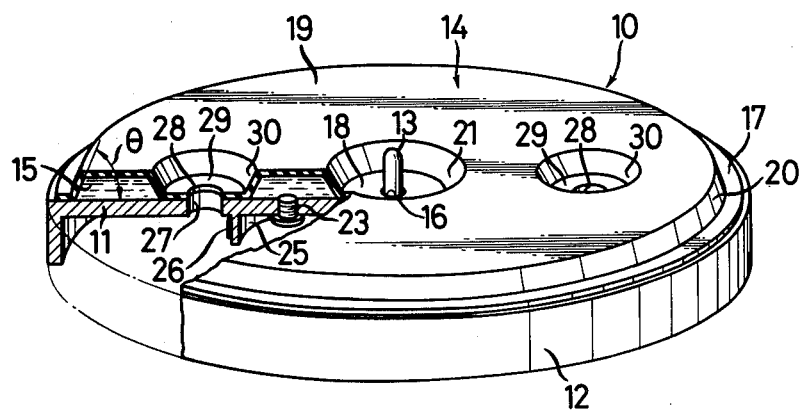
FIG. 1 is a perspective view of a turntable assembly according to one embodiment of this invention, and which is shown with portions thereof being partly broken away and in section.
Figure 2:
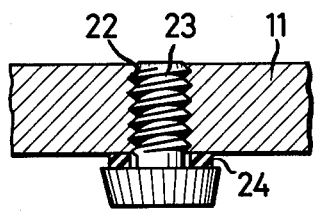
FIG. 2 is an enlarged sectional view showing a filler opening and plug with which the turntable assembly of FIG. 1 is provided.

Referring to the drawings in detail, and initially to FIGS. 1-3 thereof, it will be seen that a phonograph record turntable assembly 10 according to the present invention generally comprises a circular turntable 11, for example, of aluminum, having a depending peripheral skirt 12 and being suitably mounted for rotation about a spindle 13 projecting upwardly at the center of the turntable, and a flexible, preferably elastic sheet 14, for example, of natural or synthetic rubber or relatively thin plastic sheet material, which overlies a substantial portion of the upper surface of turntable 11 so as to cooperate with the latter in defining at least one sealed interior space 15 therebetween. In the turntable assembly 10, elastically flexible sheet 14 is shown to be substantially coextensive with turntable 11 and to have a central hole 16 through which spindle 13 may project. Further, in order to define the interior sealed space 15, the outer peripheral edge portion 17 of sheet 14 and the inner edge portion 18 of the sheet about central hole 16 are secured to the upper surface of turntable 11, for example, as by a suitable adhesive, or by respective clamping rings (not shown) which bear down on such portions and are secured to turntable 11 by screws received in tapped holes provided in the turntable.

In accordance with this invention, the annular space 15 defined by sheet 14 between its outer and inner edge portions 17 and 18 and by the underlying portion of turntable 11 is filled with a fluid material which is preferably a viscous liquid having a viscosity in the range between approximately 3000 cs and 10,000 cs, and preferably in the range between approximately 7000 cs and 8000 cs. A preferred viscous liquid to be contained in the space 15 is silicon oil, however, other viscous liquids, such as, for example, liquid polyethylene-glycol, liquid polypropylene-glycol, liquid epoxy resin, liquid paraffin, liquid polyvinyl alcohol or the like may be employed.

Preferably, the portion 19 of sheet 14 defining the upper wall of space 15 is formed to be normally flat and is joined to the outer and inner edge portions 17 and 18 by downwardly inclined wall portions 20 and 21, respectively, which are formed to normally include acute angles $\theta$ with respect to the upper surface of turntable 11 therebetween. In a particular example of the turntable assembly 10 according to this invention, and in which sheet 14 is formed of rubber and has an outer diameter of 290 mm, the thickness of such sheet is approximately 0.5 to 1.0 mm, and the height of the interior space 15 is normally from about 1.0 to 2.0 mm.

In order to facilitate the introduction of the viscous liquid into the sealed space 15 following the attachment of sheet 14 to turntable 11, the turntable is formed with at least one filler opening 22 communicating with space 15 and through which the viscous liquid may be introduced with turntable assembly 10 inverted, whereupon each filler opening 22 is suitably closed or sealed, for example, by means of a tapped plug 23 and a rubber sealing ring 24, as shown on FIG. 2, or by means of an adhesive or cement which permanently seals filler opening 22 after the introduction of the viscous liquid.

Further, as shown on FIG. 1, the turntable 11 of assembly 10 may be provided with a depending circular flange 25 which is adapted to be engaged by a belt 26 for driving the turntable from the usual drive motor (not shown). It will be apparent that the engagement of drive belt 26 with flange 25 presents a problem, as such engagement has to be effected after turntable 11 has been installed on spindle 13, at which time only a small clearance exists between skirt 12 of the turntable and the top surface or deck of the cabinet (not shown) on which the turntable is mounted. Therefore, in accordance with this invention, turntable 11 may be provided with access openings 27 extending therethrough adjacent the outer surface of flange 25. Further, sheet 14 is provided with holes 28 which register with openings 27, and the edge portion 29 of sheet 14 about each hole 28 is also adhesively or otherwise secured to the underlying upper surface of turntable 11. Each edge portion 29 secured to the turntable is joined to the normally flat portion 19 of sheet 14 by an inclined portion 30 which, as in the case of the portions 20 and 21 of sheet 14, includes an acute angle with the upper surface of turntable 11. It will be apparent that, by reason of the holes 28 in sheet 14 and the registering openings 27 in turntable 11, access is provided therethrough to the underside of the turntable for manipulating belt 26 onto flange 25 after the turntable has been installed on spindle 13.

As shown on FIG. 3, if a phonograph record R placed on the normally flat portion 19 of sheet 14 is warped or distorted, for example, has a portion of its outer periphery distorted upwardly by a distance $a$ from the plane of the remainder of the record, the sheet 14 and the viscous liquid in sealed space 15 are suitably deformed by the weight of record R so that the undersurface of the record is in intimate contact with the entire area of portion 19 of sheet 14. Accordingly, even though record R is warped, the entire portion thereof having a record groove therein is uniformly supported by turntable assembly 10 according to this invention and no gaps appear therebetween. Thus, when a conventional cartridge 31 has its stylus 32 or needle pressed downwardly into the record groove during reproduction of the signal recorded therein, there are no unsupported or floating portions of the warped record that would be susceptible to vertical vibration at the resonance frequency of the record and accurate reproduction of the recorded signal is achieved. Furthermore, any vibrations transmitted to turntable 11, for example, from the motor for driving the latter or as a result of impacts or shocks to which the cabinet of the record player may be subjected, are absorbed or damped by the viscous liquid in space 15 so that such vibrations are not transmitted to the record and thence to cartridge 31. Therefore, cartridge 31 picks up only the signals actually recorded in the groove of phonograph record R and accurate reproduction of such signals is ensured. It is further to be noted that the sloping arrangement of portions 20, 21 and 30 of sheet 14 which define the peripheral walls of space 15 ensures that such peripheral walls can be easily flexed downwardly when required to achieve uniform contact of sheet portion 19 with the undersurface of a warped phonograph record placed thereon. Thus, in the case of a phonograph record having its outer peripheral portion warped upwardly, as on FIG. 3, the sloping arrangement of the portion 21 of sheet 14 ensures that the portion 21 will be easily deformed downwardly to permit full contact of the normally flat portion 19 of the sheet with the undersurface of the warped record, rather than tending to relatively strongly support the record at the inner margin of portion 19, as indicated at A on FIG. 3.

Referring now to FIG. 4, it will be seen that, in a turntable assembly 10a according to another embodiment of this invention which is generally similar to the turntable assembly 10 and has its corresponding parts identified by the same reference numerals, the outer peripheral edge portion 17a of the elastically flexible sheet 14 is directed downwardly over, and adhesively or otherwise secured to the outer surface of skirt 12 on turntable 11, rather than to the upper surface of the turntable, as in the first described embodiment. The turntable assembly 10a functions in the same manner as the previously described turntable assembly 10 to provide uniform contact for a record placed thereon, even though such record is warped or distorted, and further to absorb vibrations that would otherwise be transmitted to or induced in the phonograph record.

Referring now to FIG. 5, it will be seen that in a turntable assembly 10b according to another embodiment of this invention which is otherwise similar to the previously described turntable assembly 10 and has its corresponding parts identified by the same reference numerals, small solid particles 33, for example, constituted by small glass beads, a powdered material or the like, are also contained in the sealed space 15 so as to float within the viscous liquid in such space. Preferably, the solid particles 33 floating in the viscous liquid are of a specific gravity substantially equal to that of the viscous liquid so that the solid particles will remain uniformly dispersed within the viscous liquid in space 15. When vibrations are transmitted to turntable assembly 10b or are induced in a phonograph record placed thereon, there is frictional resistance to the movement of the viscous liquid relative to the solid particles 33 floating therein, and such frictional resistance enhances the vibration-damping properties of turnable assembly 10b.

It will be apparent that, when the turntable 11 of assembly 10, 10a or 10b is inclined in respect to a horizontal plane, the viscous liquid in the single annular space 15 will tend to flow into the portion of such space which is lowermost with the result that the normally flat portion 19 of sheet 14 will not be parallel to the surface of turntable 11 when the latter is at rest. Thereafter, when a phonograph record is placed on portion 19 of sheet 14 and turntable 11 is rotated for a reproducing operation, the record will undergo a wobbling movement relative to the turntable even if the record itself is absolutely flat. Referring now to FIG. 6, it will be seen that the foregoing can be avoided in a turntable assembly 10c according to another embodiment of this invention which, except as indicated below, is identical with the turntable assembly 10a of FIG. 4 and has its corresponding parts identified by the same reference numerals. As shown, the turntable assembly 10c further comprises absorbent material 34 within the space 15 which is capable of absorbing or taking up the viscous liquid in such space. The absorbent material 34 may have a sheet-like configuration, as shown, and be formed of a natural or synthetic sponge material or a fibrous material, such as, carbon fibers, which is capable of absorbing or taking up the viscous liquid. By reason of the inclusion of the absorbent material 34 in space 15, the viscous liquid is substantially uniformly retained throughout the space 15 even when the turntable 11 is not horizontally disposed. Of course, the absorbent material 34 has to be easily compressible so that it will not interfere with the deformation of elastically flexible sheet 14 when a warped record is placed on the latter.

In each of the above described embodiments of the invention, a single annular space 15 has been provided between the elastically flexible sheet 14 and the underlying surface of turntable 11. However, as shown on FIG. 7, a turntable assembly 10d according to this invention may have its elastically flexible sheet 14d formed with a plurality of circular, concentric flanges 35 depending from its normally flat portion 19d at radially spaced apart locations between the sloping portions 20d and 21d. Such flanges 35 may be provided with footed lower edges, as shown, which are adhesively secured to turntable 11d at the same time as the outer and inner edge portions 17d and 18d of sheet 14d are secured to the turntable. Thus, sheet 14d cooperates with turntable 11d to define a plurality of annular spaces 15d therebetween which, in accordance with this invention, are filled with a viscous liquid. Of course, each of the spaces 15d on FIG. 7 may also contain particles floating in the viscous liquid, as in the embodiment of FIG. 5, or an absorbent material, as in the embodiment of FIG. 6. The flanges 35 constituting partitions between the adjacent spaces 15d may extend circumferentially and be radially spaced from each other, as shown on FIG. 6, or such partitions may extend radially and be angularly spaced from each other. Furthermore, a turntable assembly according to this invention having a configuration similar to that illustrated on FIG. 7, that is, having a plurality of concentric sealed interior spaces, may include, in place of the single elastically flexible sheet 14d, a plurality of concentric circular members of elastically flexible material of inverted U-shaped cross-section having their edges adhesively secured to the turntable 11d with such members in a nested relationship, whereupon, the annular space defined between each circular member of inverted U-shaped cross-section and the turntable is filled with a viscous liquid.

In all instances where the turntable assembly is provided with a plurality of interior spaces which are sealed or isolated in respect to each other, the turntable is formed with a filler opening, for example, at 22d on FIG. 7, communicating with each of the spaces 15d so that the viscous liquid can be supplied to the respective space 15d through each filler opening 22d with the turntable assembly 10d in an inverted position, whereupon, each filler opening 22d is suitably sealed, for example, with a cement plug 23d, as on FIG. 7, or with a suitable tapped plug, as indicated at 23 in the previously described embodiments.

As a further alternative or modification of the turntable assembly 10d shown on FIG. 7, the elastically flexible sheet 14d may be replaced by an elongated elastically flexible member of inverted U-shaped cross-section which is spirally arranged on turntable 11d and which has its longitudinal edges adhesively secured to the surface of the turntable.

Although specific embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A phonograph record turntable comprising a rotatable turntable, mounting means therefor, generally circular, flexible sheet means overlying a substantial portion of the upper surface of said turntable, means securing said flexible sheet means liquid tight to the turntable along at least the outer peripheral edge portion of the sheet means for defining at least one enclosed space between said sheet means and said portion of the upper surface of said turntable, and a viscous liquid disposed in each space so that said sheet means provides a cushioned, vibration-damping support surface for a phonograph record which support surface conforms to the shape of the latter; And in which said space further contains particles floating in said viscous liquid.

2. A phonograph record turntable assembly according to claim 1; in which said viscous liquid and said particles have substantially the same specific gravity so that said particles will be substantially uniformly dispersed within said viscous liquid.

3. A phonograph record turntable assembly comprising a rotatable turntable, mounting means therefor, generally circular, flexible sheet means overlying a substantial portion of the upper surface of said turntable, means securing said flexible sheet means liquid tight to the turntable along at least the outer peripheral edge portion of the sheet means for defining at least one enclosed space between said sheet means and said portion of the upper surface of said turntable, and a viscous liquid disposed in each space so that said sheet means provides a cusioned, vibration-damping support surface for a phonograph record which support surface conforms to the shape of the latter; and in which said flexible sheet means is also secured to said turntable at a radially inner circumferentially extending edge portion of said sheet means, and said sheet means has sloping portions extending from said inner and outer edge portions to a normally flat portion of said sheet means.

* * * * *